April 18, 1950         J. G. HANEIKO ET AL         2,504,123
ELECTRONIC SYSTEM FOR OPERATING DIRECT-CURRENT
MOTORS FROM AN ALTERNATING CURRENT SUPPLY
Filed May 27, 1948

WITNESSES:

INVENTORS
John G. Haneiko and
Walter G. Roman.
BY
ATTORNEY

Patented Apr. 18, 1950

2,504,123

UNITED STATES PATENT OFFICE 2,504,123

ELECTRONIC SYSTEM FOR OPERATING DIRECT-CURRENT MOTORS FROM AN ALTERNATING-CURRENT SUPPLY

John G. Haneike, East Aurora, and Walter G. Roman, Buffalo, N. Y., assignors to Westinghouse Electric Corporation, East Pittsburgh, Pa., a corporation of Pennsylvania Application May 27, 1948, Serial No. 29,426

4 Claims. (Cl. 318—345)

Our invention relates to electronic systems for energizing direct-current motors from an alternating-current source. More specifically, the invention concerns systems in which the motor has a field separately excited by rectified current of normally constant voltage and an armature energized through controllable gas discharge devices by rectified current of adjustable voltage.

It is an object of the invention to provide electronic systems of the type mentioned that secure a satisfactory control or regulation of the motor speed with the aid of equipment of simpler design than heretofore necessary.

Another object of the invention is to reduce in such systems the number or amount of components, such as transformers, rectifiers, vacuum tubes, as compared with the known speed-regulated or speed controllable drive systems.

According to the invention, we connect the separately excited field circuit of the motor and also the motor armature circuit with the grid or control circuit of the armature rectifier tubes so that all or part of the armature voltage is compared with all or part of the field voltage, and the difference between the two voltages is effective as a direct-current bias on the armature rectifier tubes for controlling the armature voltage and motor speed. In such a system, the field voltage or part thereof serves as a reference voltage and this voltage can readily be given the order of magnitude required for a direct control of the armature rectifier tubes. In this manner, we not only eliminate the separate power source or rectifier system heretofore used for providing the reference voltage but also obviate the need for the power amplifier heretofore employed between the reference voltage source and the rectifier grid or control circuit proper.

According to another feature of the invention, subsidiary to the feature mentioned above, we energize the armature circuit and the field circuit from the same secondary winding of the main power transformer of the system, and we attach the field circuit to the armature circuit with the polarity of connection required to have the armature voltage series opposed to all or part of the field voltage.

Figure 1:
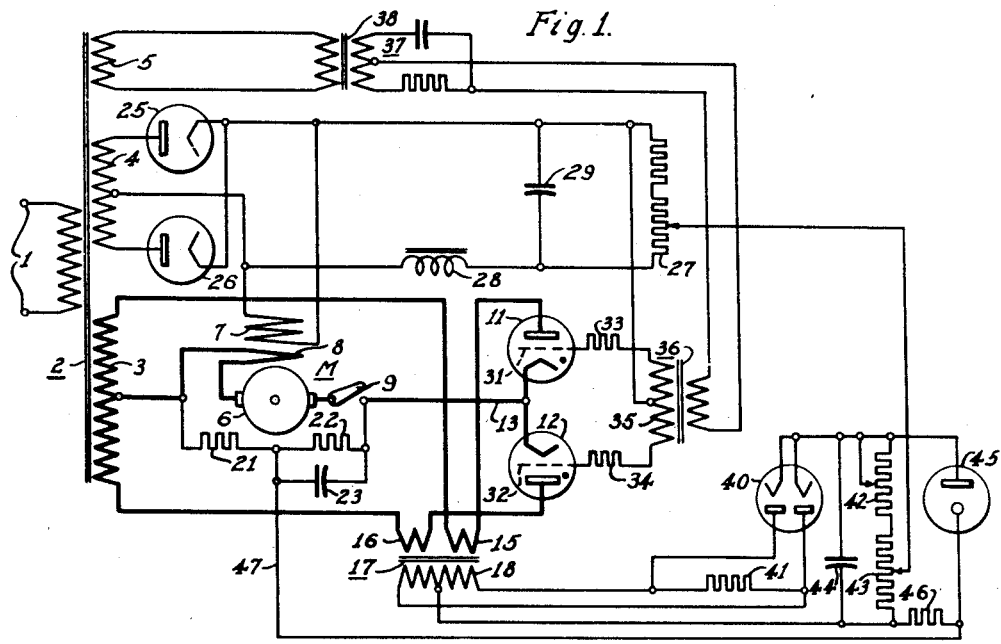
Figure 2:
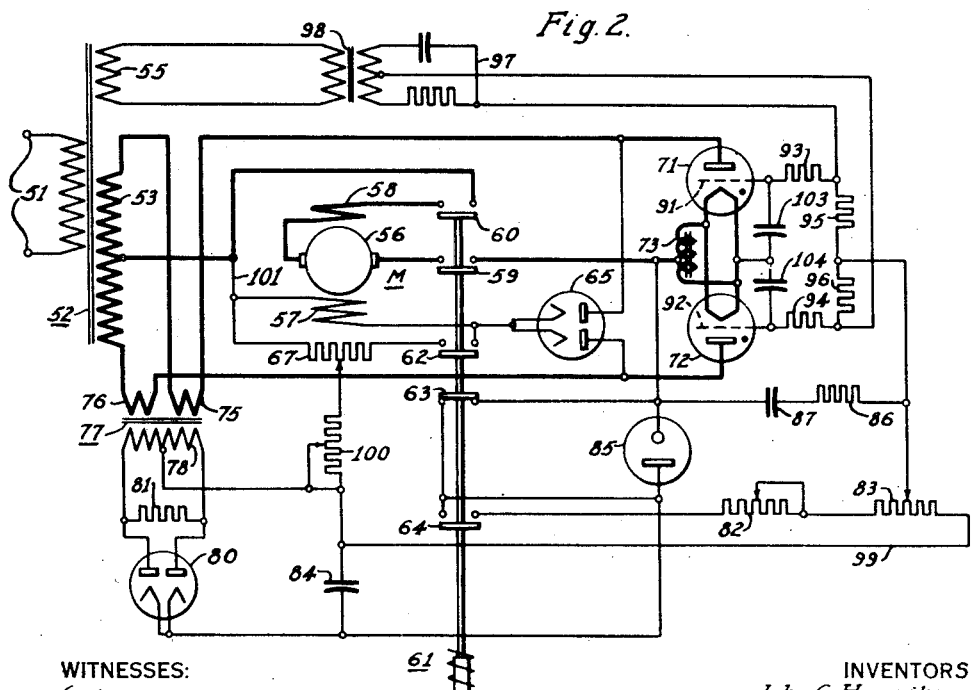

These and other objects and features of the invention will be apparent from the following description of the two embodiments of motor control systems according to the invention shown in Figs. 1 and 2, respectively, of the drawing.

A system according to Fig. 1 is energized from the primary terminals 1 of a power transformer 2 with three secondary windings 3, 4 and 5. The motor M to be controlled has its armature 6 connected to the midpoint of secondary 3 and is equipped with a separately excited main field winding 7 and a series field winding 8, the latter consisting of a compensating or interpole winding. The armature circuit includes a main switch or contactor 9 and is energized through two gaseous discharge tubes 11, 12, such as thyratrons, which are arranged for full-wave rectification and have a cathode lead 13 in common. The respective tube anodes are connected to the end points of secondary 3 through the primary windings 15 and 16 of a current transformer 17 with a midtapped secondary winding 18. Connected across the motor armature 6 is an arrangement of voltage dividing resistors 21 and 22. Parallel connected to resistor 22 is a filtering capacitor 23.

The main field winding 7 of motor M is excited from secondary 4 through full-wave connected rectifier tubes 25 and 26 so as to receive rectified excitation of constant voltage. A potentiometric rheostat 27 is connected in parallel relation to field winding 7 in order to be impressed by constant voltage. The connection includes a series-connected filtering reactor 28 and a shunt-connected filtering capacitor 29.

The control or grid circuits for the armature rectifier tubes 11 and 12 extend from the respective control grids 31, 32 through respective grid resistors 33, 34 to the end points of a midtapped secondary winding 35 in a grid voltage transformer 36. The primary winding of transformer 36 is connected through a phase shift circuit 37 and an appertaining phase shift transformer 38 to the secondary 5 of the transformer 2. Grid voltage transformer 36 impresses on the control circuits of tubes 11 and 12, two respective component alternating voltages which lag about 90° behind the respective anode voltages.

Connected to the secondary 18 of transformer 17 is a full-wave rectifier 40, shown as a twin diode, in parallel relation to a ballast resistor 41. The rectified output voltage from rectifier 40 is applied across a resistance circuit which comprises an adjustable resistor 42 and a voltage dividing rheostat 43. A filtering capacitor is provided at 44. Connected across resistor 42 and rheostat 43 is a cold-cathode glow tube 45 in series with an appertaining load resistor 46. Tube 45 is normally non-conductive and breaks down only when the rectified voltage across resistor 42 and rheostat 43 exceeds a given limit value.

The control circuits for tubes 11 and 12 have a common portion which extends from the tap point of transformer winding 35 through the tapped-off portion of the rheostat 27, thence through the tapped-off portion of rheostat 43 and through resistor 46, lead 47 and resistor 22 to the common cathode lead 13 of tubes 11 and 12.

It will be recognized that the just-mentioned control circuit for tubes 11 and 12 includes a portion of rheostat 27 and hence is impressed from this rheostat by a constant reference voltage of adjusted magnitude. The selected magnitude of this voltage determines the speed at which the motor M is supposed to run. The control circuit for tubes 11 and 12 also includes the resistor 22 which impresses on the circuit a voltage in proportion to the armature voltage of motor M. The polarity of connection of resistor 22 relative to rheostat 27 is such that the voltage from resistor 22 is series opposed to that from rheostat 27. When the motor M is running at substantially the correct speed, the voltages from resistor 22 and rheostat 27 almost balance each other to the extent that the remaining small negative bias on the rectifier tubes 11 and 12 has the value necessary for maintaining the firing angle of the tubes at the proper value.

Included in the grid circuit of tubes 11 and 12 is also the tapped-off portion of rheostat 43. This rheostat is impressed by a voltage drop from rectifier 40 which is proportional to the load current flowing in the armature circuit of the motor and consequently proportional to the IR drop in the armature circuit. In this manner, the control of the tubes 11 and 12 is automatically compensated for changes in motor speed due to changes in IR drop. As a result, the motor M runs substantially at a constant speed determined by the selected setting of the rheostat 27. If the motor tends to increase its speed above the proper value, the corresponding rise in the portion of the armature voltage impressed across resistor 22 causes the grids of tubes 11 and 12 to become more negative. Thus the firing point of these tubes is delayed which, in turn, reduces the armature voltage impressed on the motor and thereby prevents the speed increase. Conversely, if the motor speed tends to drop below the correct value, the change in voltage across resistor 22 causes the grid voltage of tubes 11 and 12 to become more positive than advancing the firing point of these tubes with the result of increasing the armature voltage of the motor in order to counteract the loss in speed.

The system operates automatically to limit the current flowing through the armature circuit thus preventing the occurrence of overloads damaging to the tubes and also providing an automatic acceleration control during starting periods of the motor. This current limiting effect is due to the performance of the glow tube 45 in conjunction with the appertaining load resistor 46. When the armature current of the motor increases beyond a predetermined value, the rectified voltage impressed by rectifier 40 across resistor 42 and rheostat 43 exceeds the breakdown value of tube 45. Consequently, tube 45 becomes conductive and impresses a voltage drop on resistor 46 which, it will be remembered, is series connected in the common portion of the control circuits for tubes 11 and 12. This voltage drop in resistor 46 is of opposed polarity relative to that impressed across the tapped-off portion of rheostat 27 and hence forces the control grids of tubes 11 and 12 to become negative. In this manner, the conductance of tubes 11 and 12 is reduced, or the two tubes are rendered temporarily non-conductive, so that the supply of current to the motor armature is correspondingly limited.

It will be recognized that the system according to Fig. 1 performs its speed regulating and current limiting operations without requiring the provision of electronic amplifier systems between the sources of grid control voltage and the control circuit proper of the controllable rectifier tubes. As a result, the number of circuit devices is considerably reduced in comparison with known motor control systems of this general type and the appertaining circuits are greatly simplified. A further simplification can be obtained by energizing the armature circuit and the field circuit of the motor from the same winding of the power transformer, for instance in the manner exemplified by the embodiment shown in Fig. 2.

In Fig. 2, the alternating-current terminals 51 of the system are attached to the primary of a transformer 52 with secondary windings 53 and 55. The armature of the motor M is denoted by 56, the appertaining main field winding by 57 and a series field winding by 58. The armature circuit is controlled by contacts 59 and 60 of a contactor 61 which is equipped with additional contacts 62, 63 and 64. The contactor 61 is to be energized during the operating periods of the motor by means of a contactor control circuit of customary design (not illustrated).

The main field winding 57 and the motor armature circuit have a common circuit point which is connected to the tap point of transformer winding 53 under control by contact 60. The other end of field winding 57 is connected through a twin rectifier 65 to the respective end points of winding 53. A potentiometeric rheostat 67 is connected across field winding 57 under control by contact 62.

The armature circuit is connected through respective rectifier tubes 71, 72, such as thyratrons, to the respective end points of the same transformer winding 53. A reactor 73 is disposed between the cathodes of tubes 71, 72 and the adjacent terminal of the motor armature circuit. The reactor 73 consists of the secondary winding of the filament transformer for tubes 71 and 72. Two primaries 75, 76 of a current transformer 77 are interposed between the respective anodes of tubes 71, 72 and the transformer winding 53. Transformer 77 has a midtapped secondary 78. A twin rectifier 80 is connected across winding 78 in parallel to a load resistor 81. The output voltage from rectifier 80 is applied through contact 64 across the series arrangement of a resistor 82 and a potentiometric rheostat 83. A filtering capacitor 84 is connected across the series arrangement. When contactor 61 is energized, a cold-cathode tube 85 is connected across resistor 82 and a portion of rheostat 83 in series with a load resistor 86 and a capacitor 87.

The grid circuits for tubes 71 and 72 extend from respective control grids 91, 92 through respective grid resistors 93, 94 to the end points of two series connected resistors 95 and 96. Resistors 95 and 96 are impressed by alternating voltage through a phase shift circuit 97 and an appertaining phase shift transformer 98 from the secondary 53 of power transformer 52. In this manner, the grid of each tube 71 and 72 is impressed by an alternating component of grid voltage of about 90° phase lag relative to the anode voltages of the respective tubes.

The grid circuits for tubes 71 and 72 have a common portion which extends from a point between resistors 95 and 96 through a portion of rheostat 83, a lead 99, a resistor 100, an adjusted portion of resistor 67 and a lead 101, thence through contact 60 and series field winding 58, armature 56, contact 59 and reactor (transformer) 73 to the cathodes of tubes 71 and 72. The adjusted portion of rheostat 67 impresses on this grid circuit a constant reference voltage of selected magnitude which determines the speed at which the motor is supposed to run. The grid circuit also includes the armature 56 and consequently is impressed with the armature voltage in series opposition to the voltage taken from the speed control rheostat 67. In this manner, the full armature voltage is compared with a portion of the field voltage and the difference between these two voltages is applied to the grids of the main armature power tubes. The system also provides for IR drop compensation due to the performance of transformer 77 and rectifier 80 which impresses across the adjusted portion of rheostat 83 a corrective component grid voltage in proportion to the IR drop in the motor armature circuit.

In order to bias the main power tubes 71, 72 to zero current when the contactor 61 is deenergized, the contact 63 is connected across the tube 85, and the normally open contact 64 is connected in series with the current limit or IR-drop potentiometer rheostat 83. Under these conditions, the small current drawn by the field winding 57 is effective in the current transformer 77 and, upon rectification by rectifier 80, is applied to the grid circuit of the tubes 71, 72 in a negative sense, thus forcing them far enough negatively to block any current in these tubes. When the motor is started by energizing the contactor 61, the armature is connected to the rectifier tubes 71, 72 and, at the same time, contact 64 is closed and contact 63 is opened. Since the armature voltage is initially zero and the potentiometer rheostat 83 is now connected to a more positive point of the field voltage, the grids of the tubes 71, 72 become positively biased immediately. The rate at which the grids can go positive is determined by respective capacitors 103, 104 between the grids and the respective cathodes of these two tubes. Therefore, the current is permitted to build up until the current limit devices assume control. From this point on, the acceleration is under current limit control substantially in the same manner as described above with reference to Fig. 1.

It will be apparent to those skilled in the art from the study of this disclosure that systems according to the invention can be altered and modified in various respects and may be embodied in circuits other than those specifically illustrated and described without departing from the objects and essential features of our invention and within the scope of the claims annexed hereto.

We claim as our invention:

1. A drive system, comprising a power transformer having a secondary with two end points and a tapped midpoint, a direct-current motor having an armature and a field winding with a common circuit point attached to said midpoint, first full-wave rectifier means disposed between said field winding and said respective end points, two controllable rectifier tubes connected between said armature and said respective end points for full wave rectification and having respective control circuits with a common circuit position, and said armature and said field winding being connected with said common circuit portion in series opposed voltage relative to each other.

2. A drive system, comprising a power transformer having a secondary with two end points and a tapped midpoint, a direct-current motor having an armature and a field winding with a common circuit point attached to said midpoint, first full-wave rectifier means disposed between said field winding and said respective end points, two controllable rectifier tubes connected between said armature and said respective end points for full wave rectification and having respective control circuits with a common circuit portion, said armature and said field winding being connected with said common circuit portion in series opposed voltage relation to each other, a transformer having a primary connected between one of said tubes and the appertaining one of said end points and having a secondary, a rectifier circuit connected to said secondary and attached to said control circuit, whereby said tubes are controlled for operating said motor at a substantially constant speed.

3. A drive system, comprising a power transformer having a secondary with two end points and a tapped midpoint, a direct-current motor having an armature and a field winding with a common circuit point attached to said midpoint, first full-wave rectifier means disposed between said field winding and said respective end points, two controllable rectifier tubes connected between said armature and said respective end points for full wave rectification and having respective control circuits with a common circuit portion, an adjustable potentiometric rheostat connected in parallel with said field winding and connected in said control circuit to provide adjustable reference voltage therefor, and said armature being connected with said control circuit in voltage opposition to said rheostat.

4. A drive system, comprising a power transformer having a secondary with two end points and a tapped midpoint, a direct-current motor having an armature and a field winding with a common circuit point attached to said midpoint, first full-wave rectifier means disposed between said field winding and said respective end points, two controllable rectifier tubes connected between said armature and said respective end points for full wave rectification and having respective control circuits with a common circuit portion, an adjustable potentiometric rheostat connected in parallel with said field winding and connected in said control circuit to provide adjustable reference voltage therefor, said armature being connected with said control circuit in voltage opposition to said rheostat, a transformer having a primary connected between one of said tubes and the appertaining one of said end points and having a secondary, a rectifier circuit connected to said secondary and attached to said control circuit, whereby said tubes are controlled for operating said motor at a substantially constant speed depending upon said reference voltage.

JOHN G. HANEIKO.
WALTER G. ROMAN.

REFERENCES CITED

The following references are of record in the file of this patent:

UNITED STATES PATENTS

| Number | Name | Date |
|---|---|---|
| 2,082,496 | Howe | June 1, 1937 |
| 2,236,086 | Conover | Mar. 25, 1941 |
| 2,342,657 | Grabau | Feb. 29, 1944 |
| 2,422,147 | Tornquist | June 10, 1947 |